(12) United States Patent
Gleason et al.

(10) Patent No.: US 9,021,853 B1
(45) Date of Patent: May 5, 2015

(54) DIMENSIONALLY STABLE LONG, CALIBRATION DEVICE

(71) Applicants: Joseph A. Gleason, Whittier, CA (US); Eugene A Gleason, Jr., Huntington Park, CA (US)

(72) Inventors: Joseph A. Gleason, Whittier, CA (US); Eugene A Gleason, Jr., Huntington Park, CA (US)

(73) Assignee: Micro Surface Engineering, Inc., Los Angeles, CA (US)

( * ) Notice: Subject to any disclaimer, the term of this patent is extended or adjusted under 35 U.S.C. 154(b) by 0 days.

(21) Appl. No.: 14/288,273

(22) Filed: May 27, 2014

(51) Int. Cl.
*G01B 21/04* (2006.01)
*G01D 18/00* (2006.01)

(52) U.S. Cl.
CPC .............. *G01D 18/00* (2013.01); *G01B 21/042* (2013.01)

(58) Field of Classification Search
CPC ... G01B 21/042; G01B 21/045; G01B 21/047
USPC .......................................................... 33/502
See application file for complete search history.

(56) References Cited

U.S. PATENT DOCUMENTS

| | | | | |
|---|---|---|---|---|
| 3,176,403 | A * | 4/1965 | Meyer | 33/702 |
| 4,633,592 | A * | 1/1987 | Wahli | 33/493 |
| 4,763,507 | A * | 8/1988 | Zofchak | 73/1.81 |
| 4,777,728 | A * | 10/1988 | Ludicke | 33/702 |
| 4,932,136 | A * | 6/1990 | Schmitz et al. | 33/502 |
| 5,269,067 | A * | 12/1993 | Waeldele et al. | 33/502 |
| 5,430,948 | A * | 7/1995 | Vander Wal, III | 33/502 |
| 5,671,541 | A * | 9/1997 | Dai et al. | 33/502 |
| 5,799,406 | A * | 9/1998 | Truran | 33/502 |
| 6,243,527 | B1 * | 6/2001 | Dawson-Elli | 385/136 |
| 6,493,957 | B1 * | 12/2002 | Takatsuji et al. | 33/502 |
| 6,742,274 | B2 * | 6/2004 | Kawada | 33/702 |
| 6,836,323 | B2 * | 12/2004 | Schmadel | 356/243.1 |
| 7,197,834 | B2 * | 4/2007 | Heimer | 33/502 |
| 7,301,638 | B1 * | 11/2007 | Tortonese et al. | 356/430 |
| 7,997,001 | B1 * | 8/2011 | Mekid | 33/783 |
| 8,051,575 | B2 * | 11/2011 | Bridges et al. | 33/502 |
| 8,141,264 | B2 * | 3/2012 | Brunson | 33/702 |
| 8,413,948 | B2 | 4/2013 | Kemeny | |
| 2002/0148133 | A1 * | 10/2002 | Bridges et al. | 33/702 |
| 2004/0036867 | A1 * | 2/2004 | Jedamzik et al. | 356/243.1 |
| 2014/0109646 | A1 * | 4/2014 | Manlay | 73/1.75 |
| 2014/0144203 | A1 * | 5/2014 | Kohler et al. | 73/1.01 |
| 2014/0180620 | A1 * | 6/2014 | Hicks | 702/95 |

OTHER PUBLICATIONS

"All Ball Bars (Dumbbells)", available on the Internet at <http://www.precisionballs.com/all_bar_bar.php>, accessed on Dec. 1, 2014.*

* cited by examiner

*Primary Examiner* — David A Rogers
(74) *Attorney, Agent, or Firm* — Kenneth L. Green; Averill & Green

(57) ABSTRACT

A calibration device provides a lightweight rigid support for a long arm. The rigid support includes thin flat sheets separated by a light weight filler. The filler prevents wrinkling or rippling of the flat sheets. Three ball trihedral nest kinematic mounts may be attached to opposite ends of the long arm for precise mounting of retro-reflectors for optical calibration, or precision spheres may be attached to the opposite ends of the long tube to obtain a mechanical calibration standard.

20 Claims, 3 Drawing Sheets

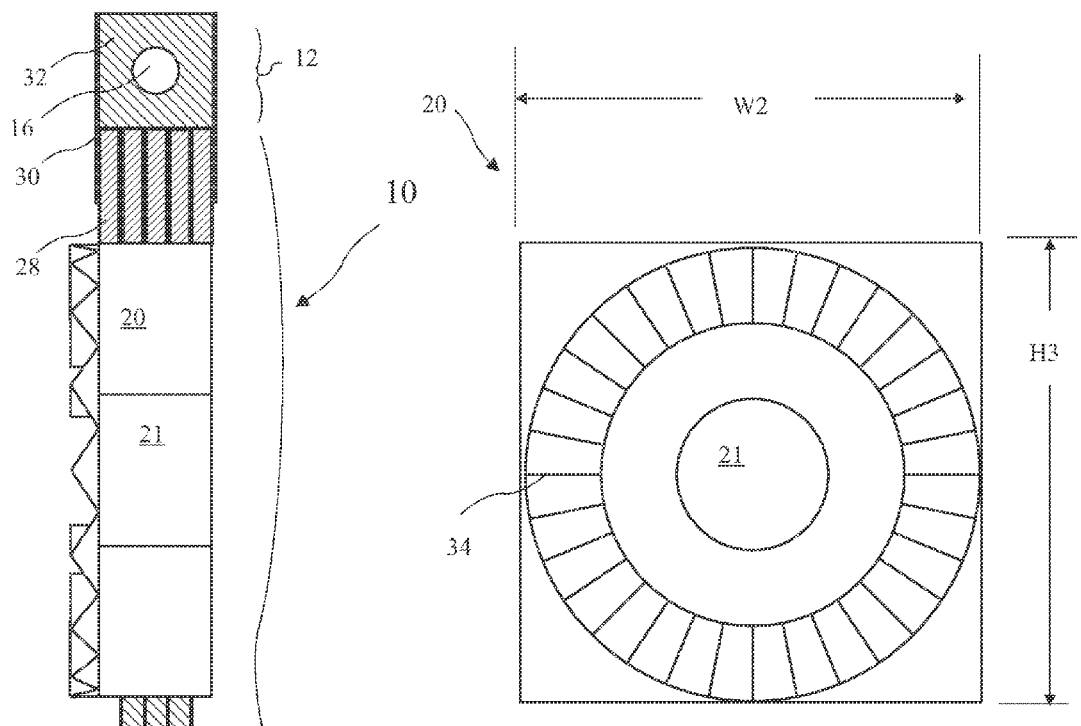
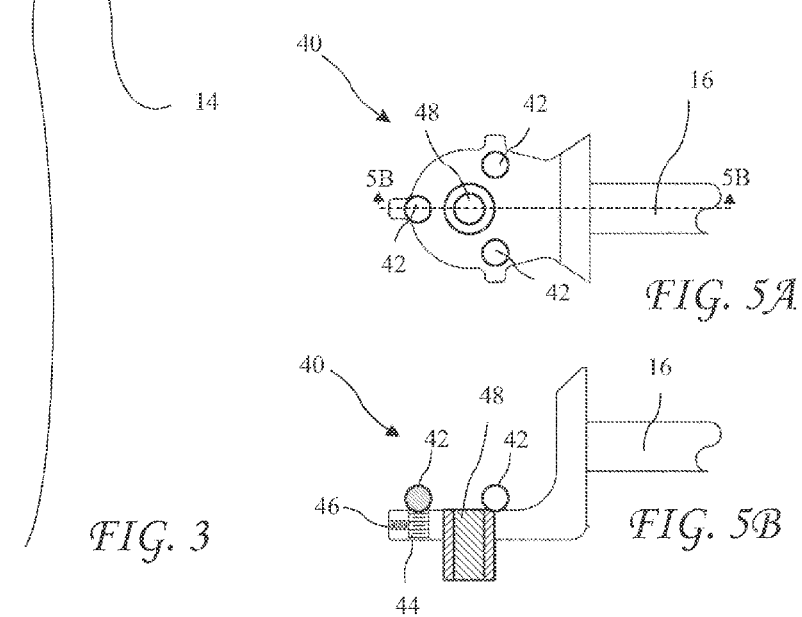
FIG. 3
FIG. 4
FIG. 5A
FIG. 5B

DIMENSIONALLY STABLE LONG, CALIBRATION DEVICE

BACKGROUND OF THE INVENTION

The present invention relates to extremely accurate measuring devices and in particular to a calibration device for such devices.

Known long calibration device designs include a header including a central low thermal expansion or contraction core, and stiff spacers to provide a neutral bending plane to the physical center line of the device. Even with the inclusion of the stiff spacers, the neutral bending plane of the known long calibration device is shifted somewhat below the centroid of the measuring axis when the long calibration devices are moved between a vertical and horizontal orientation and several intermediate positions, introducing a very small error due to the deflection caused by the force of gravity acting on the long calibration device. For ordinary calibration applications, this very small error is minute and unimportant because the overall structure is so rigid. Unfortunately, even this minute error is not acceptable when very high precision measurements are required.

One solution to the deflection is to add four structural sheets residing below a central shaft of the long calibration device, with two of the four sheets oriented at 180 degrees to the other two sheets. This solution is not generally used because it doubles the bulkiness of the overall device. Thus, a new design is needed to provide where high precision measurements are required.

Further, the accuracy of long calibration devices has always been a major problem. The accuracy of the actual calibration has been suspect, due to serious errors due to bending from the force of gravity and their temperature sensitivity. Serious change in length due to deflections of the artifact, when its orientation is changed from vertical to horizontal, is a major short coming of conventional very long calibration devices. Thus, a need remains for a long calibration device not affected by orientation or temperature.

BRIEF SUMMARY OF THE INVENTION

The present invention addresses the above and other needs by providing a calibration device provides a lightweight, rigid support for a long arm. The rigid support includes thin sheets separated by either a lightweight filler or an air gap or a combination thereof. In lieu of the filler, one or more lightweight beams of small cross-section may be glued in position between the flat sheets, with a high shear strength glue. The filler prevents wrinkling or rippling of the flat sheets. Three ball, trihedral nest, kinematic mounts may be attached to opposite ends of the long arm for precise mounting of retroreflectors for optical calibration, or precision spheres may be attached to the opposite ends of the long arm to obtain a mechanical calibration standard.

In accordance with one aspect of the invention, there is provided a light weight and rigid long calibration device. The long dimensional calibration devices must be light enough so that one calibration technician can position the device in many orientations and locations. In order to maintain its original dimensional characteristics while being moved all the way from vertical to horizontal and several positions in between, the very long calibration device must be extremely rigid. The novel design of this device uses several large sheets of very thin, light weight structural material. The large shear area of these thin sheets is at right angles to the bending moment caused by the force of gravity acting on the device, as it is moved to the various positions all the way from vertical to horizontal. The sheets may be made from a variety of strong and light weight materials.

In accordance with another aspect of the invention, there is provided a rigid long calibration device. A header of the calibration device is attached to the structural frame of the device, so that the header is held rigid in all six degrees of freedom. Such attachment may be done by filling the body cavity of the structure with very rigid structural foam (250,000 psi Young's modules of elasticity) constraining the central core without any stresses or bending moments. Another embodiment provide a more rigid structure by filling the body cavity of the structure with plastic resin saturated with small diameter, hollow glass balls or balloons. Either embodiment is very effective and provides an extremely rigid and light weight, near monolithic structure.

In accordance with another aspect of the invention, there is provided a thermally stable, long calibration device. A flimsy low expansion material is encapsulated in the robust frame of the large thin sheets of structural material.

In accordance with still another aspect of the invention, there is provided a rigid long calibration device. Wrinkling or rippling of the large thin sheets of structural material used to form the body of the long calibration device, reduces the rigidity of the large, thin sheets. By adhesive bonding long, light weight bars of structural material, parallel to the long axis, between the sheets, near the open edge of the structure, the wrinkling or rippling tendency is eliminated.

In accordance with another aspect of the invention, there is provided a dimensionally stable very long calibration device having a central core which has a very low rate of thermal expansion or contraction. The central core may be coated with a thin layer of rubber like elastomer. This elastic coating allows the outside structural frame, with its relatively high rate of thermal expansion and contraction, to move without causing any stresses in the low expanding and contracting central core. Any change in the stress pattern would cause changes in the overall length of the calibration device.

In accordance with yet another aspect of the invention, there is provided a dimensionally stable calibration device having a hole through the long arm, from end to end, facilitating calibration. The distance between centroids of the three ball kinematic couplings on each end of the tube may be very accurately measured/calibrated using time of flight calculations with a laser.

In accordance with another aspect of the invention, there is provided a dimensionally stable calibration device having a multi toothed, gear like coupling that allows rotary indexing of the device to various positive positions all the way from vertical to horizontal and then clamping it there without any further motion.

In accordance with still another aspect of the invention, there is provided a calibration device providing a unique form of protection for the spherically mounted, corner cube reflectors. Known calibration devices hold the spherically mounted, corner cube on a plate at right angles to the central bar, making the spherically mounted, corner cube very susceptible to falling out of the mount. A shelf is provided which is parallel to the axis of the central bar of the device. The three ball trihedral nest is mounted on the surface of the shelf. This is in contrast to the normal practice of holding the spherically mounted, corner cube on a plate at right angles to the central bar, making the spherically, mounted corner cube very susceptible to falling out of the mount.

In accordance with yet another aspect of the invention, there is provided a calibration device providing a female thread in each end of the two spherical, corner cube holding devices. A male threaded post with a high precision ball mounted on the end is screwed into each of these female threads. This will turn the laser tracker calibration device into a standard Ball Bar that can be used to calibrate large coordinate measuring machines, articulating arm measuring machines, and machine tools.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 3 is a cross-sectional view of the dimensionally stable, long calibration device according to the present invention taken along line 3-23 of FIG. 1A.

FIG. 4 is a front view of an indexing gear of the dimensionally stable, long calibration device according to the present invention.

FIG. 5A shows a top view of a trihedral mount according to the present invention.

FIG. 5B shows a cross-sectional view of the trihedral mount according to the present invention taken along line 5B-5B of FIG. 5A.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
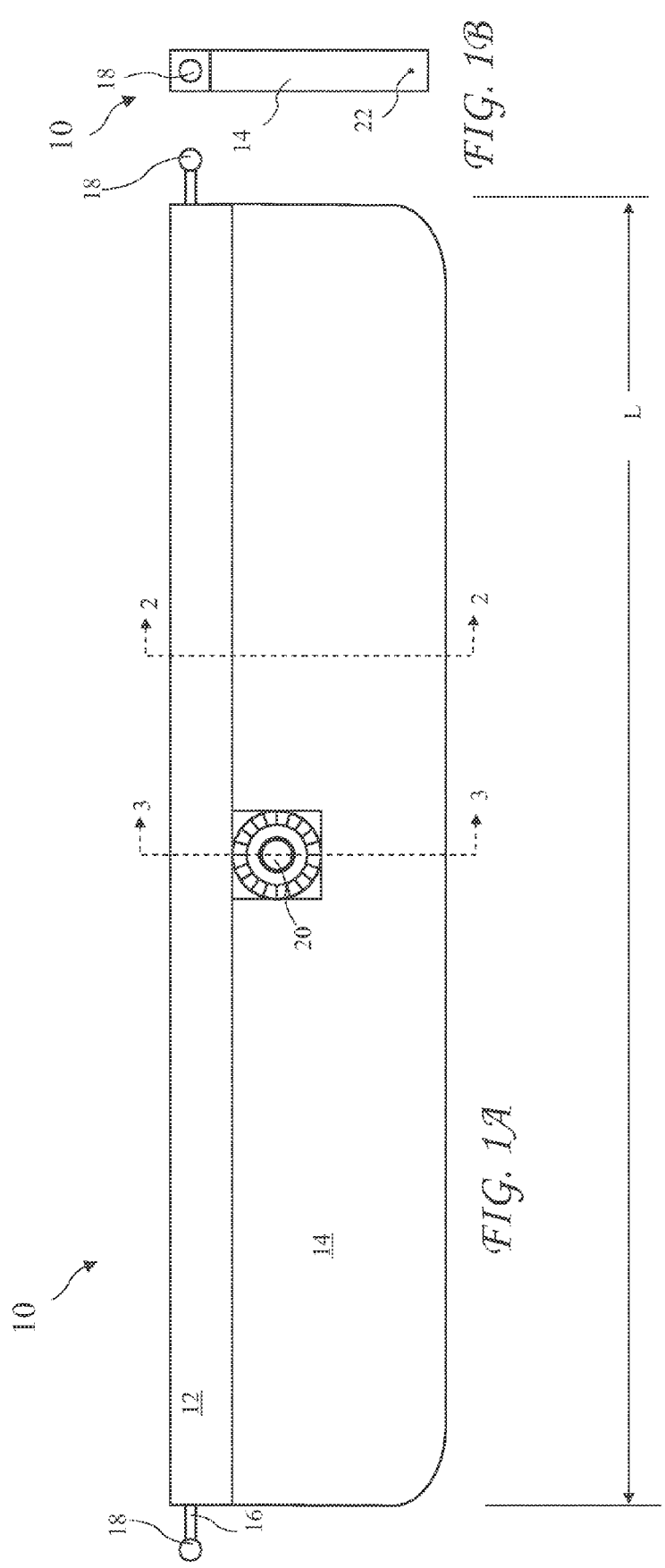
FIG. 1A is a front view of a dimensionally stable, long calibration device according to the present invention.
FIG. 1B is a side view of the dimensionally stable, long calibration device according to the present invention.

A front view of a dimensionally stable, long calibration device 10 according to the present invention is shown in FIG. 1A and a side view of the dimensionally stable, long calibration device 10 is shown in FIG. 1B. The dimensionally stable, long calibration device 10 includes a header 12 holding a long arm 16. The header 12 extends that length of the calibration device 10 and the calibration artifacts 18 are held in a precise spacing on ends of the long arm 16. An indexing plate 20 is fixed to the calibration device 10 to facilitate angular indexing of the calibration device 10 and a passage 22 reaches through the length of the support portion 14. In one embodiment the header 12 and support portion 14 have a length L of about 88 inches.

Figures 2, 2A:
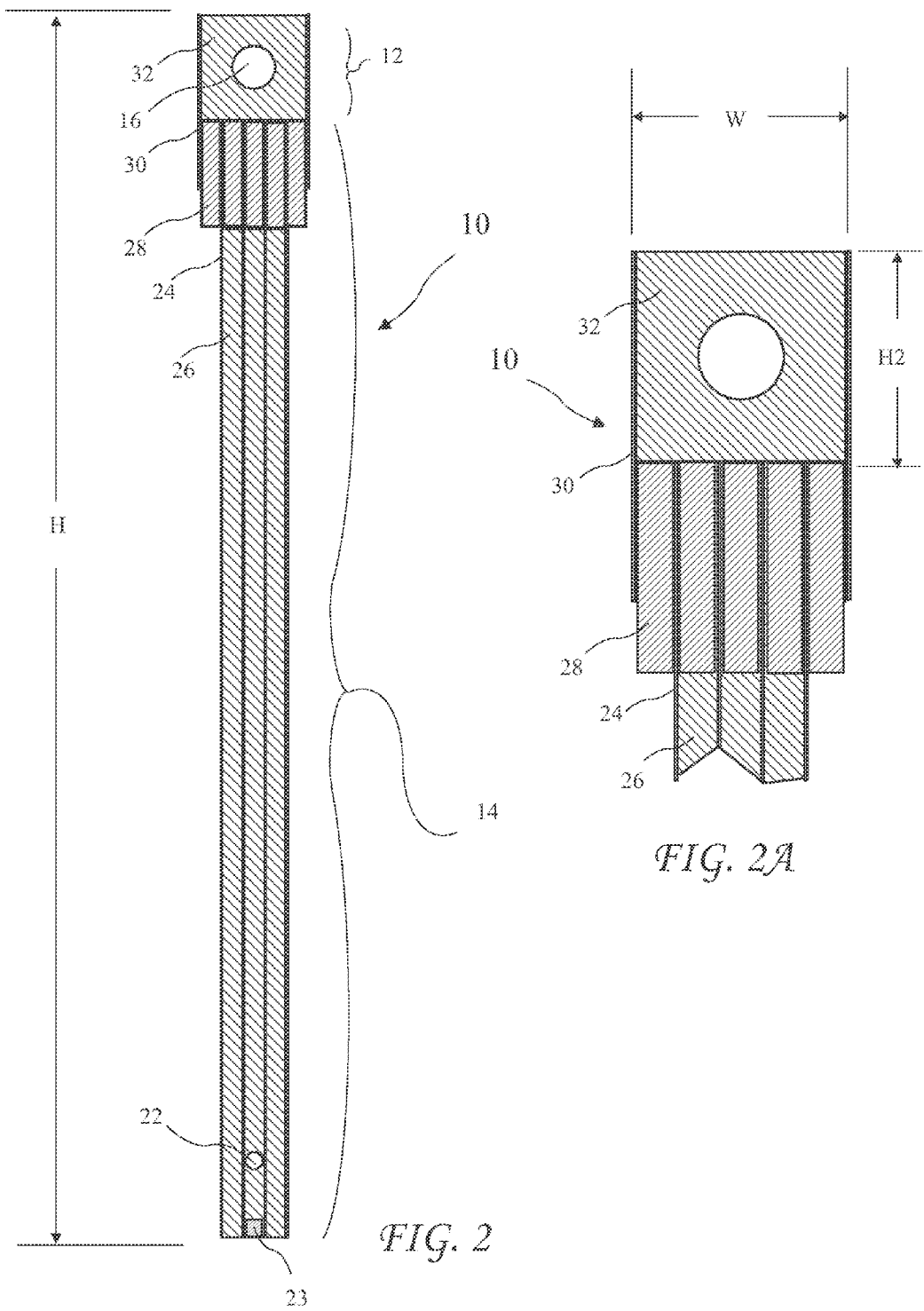
FIG. 2 is a cross-sectional view of the dimensionally stable, long calibration device according to the present invention taken along line 2-2 of FIG. 1A.
FIG. 2A is a more detailed cross-sectional view of a top portion of the dimensionally stable, long calibration device according to the present invention taken along line 2-2 of FIG. 1A.

A cross-sectional view of the calibration device 10 taken along line 2-2 of FIG. 1A is shown in FIG. 2 and a more detailed cross-sectional view of a top portion of the calibration device 10 taken along line 2-2 of FIG. 1A is shown in FIG. 2A. The calibration device 10 includes bars 28 at the top of the support portion 14 just under the header 12. The bars 28 have a cross-section of about 1.5 inches by 0.25 inches and extend the length of the support portion 14, and are preferably made of aluminum or fiberglass or carbon fiber, and more preferably made of aluminum or a material with similar structural characteristics. The header 12 is preferably filled with a thermally stable material 32, preferably a very stiff foam or micro balloons in an epoxy resin, supporting the long arm 16, and the long arm 16 may be solid or tubular, and may have a round or rectangular cross-section, or any other shape fitting within a similar envelope. Side plates 30 reside on sides of the header 12 and reach down to overlap a portion of the support portion. The side sheets are preferably not greater than 0.10 inches thick and more preferably about 0.020 inches thick and are preferably made of aluminum or fiberglass or carbon fiber, and more preferably made of aluminum or a material with similar structural characteristics. In one embodiment the header has a width W of about 1.5 inches and a height H2 of about 1.5 inches. A square rod 23 runs the length of the support portion 14 along the bottom of the support portion 14. The square rod 23 is preferably ¼ by ¼ inch aluminum adhered with a high shear strength adhesive.

The support portion 14 is provided significant structural rigidity by thin sheets 24 which substantially span the support portion 14. The thin sheets 24 are separated by either a light weight filler 24 or an air gap or a combination thereof. In lieu of the filler 24, light weight beams of small cross-section may be glued in position between the thin sheets 24, with a high shear strength glue. Preferably, the thin sheets 24 are bonded by light weight filler comprising a high shear strength adhesive and provide a very rigid sheer wall for the support portion, and the thin sheets 24 overlap the bars 28 at the top of the support portion 14. One embodiment of the calibration device 10 includes four thin sheets 24 and five bars 28. The thin sheets 24 are preferably not greater than 0.10 inches thick and more preferably about 0.020 inches thick and are preferably made of aluminum or fiberglass or carbon fiber, and more preferably made of aluminum or a material with similar structural characteristics.

A cross-sectional view of the calibration device 10 taken along line 3-3 of FIG. 1A is shown in FIG. 3 and a front view of an indexing device 20 comprising an indexing gear is shown in FIG. 4. The indexing device 20 is embedded in the support portion 14 and allows the calibration device 10 to be pivoted to various angles. The indexing device 20 preferably includes uniformly angularly spaced apart teeth 34 to provide indexing. In one embodiment, the indexing device 20 has a width W2 of about six inches and a height H3 of about six inches. A passage 21 through the indexing device 20 is provided to rotationally attach the calibration device 10 to a support or stand.

A top view of a trihedral mount 40 according to the present invention is shown in FIG. 5A and a cross-sectional view of the trihedral mount 40 taken along line 5B-5B of FIG. 5A is shown in FIG. 5B. Two of the trihedral mounts 40 reside at opposite ends of the long arm 16. The trihedral mount 40 support three balls 42 for precise mounting of retro-reflectors for optical calibration, or precision spheres may be attached to the opposite ends of the long arm to obtain a mechanical calibration standard. The balls 42 may be adjusted vertically by adjusters 44 and set screws 46 may be tightened against the adjusters 44 to hold their adjustment. A magnet 48 hold the retro-reflectors for optical calibration, or precision spheres in place, and the magnets 48 may be adjusted to adjust the retention of the retro-reflectors for optical calibration, or precision spheres.

While the invention herein disclosed has been described by means of specific embodiments and applications thereof, numerous modifications and variations could be made thereto by those skilled in the art without departing from the scope of the invention set forth in the claims.

We claim:

1. A calibration device, comprising:
    a long arm configured to support precisely spaced apart calibration artifacts;
    a header filled with a thermally stable filling surrounding the long arm;
    kinetic mounts attached to opposite ends of the arm;
    a support portion comprising:
        at least four flat sheets made from thin material attached to the header; and
        a filler holding the flat sheets to a fixed spacing.

2. The calibration device of claim 1, wherein the four flat sheets extend the length of the header.

3. The calibration device of claim 2, wherein the four flat sheets have approximately the same dimensions and reside aligned face to face.

4. The calibration device of claim 3, wherein the four flat sheets have a length to width ratio of about 5.5 to 1.

5. The calibration device of claim 4, wherein the four flat sheets have a thickness of not more than 0.100 inches.

6. The calibration device of claim 5, wherein the four flat sheets have a thickness of about 0.020 inches.

7. The calibration device of claim 5, wherein the four flat sheets are made from a material selected from the group consisting of aluminum, fiberglass, and carbon fiber.

8. The calibration device of claim 7, wherein the four flat sheets are made from aluminum.

9. The calibration device of claim 1, wherein the support portion further includes support bars running about the length of the header and residing just under the header.

10. The calibration device of claim 9, wherein the flat sheets overlap with the support bars.

11. The calibration device of claim 9, wherein:
    the support bars have a smaller height than the flat sheets; and
    the flat sheets completely overlap with the support bars.

12. The calibration device of claim 9, wherein each of the support bars has a height of about 1.5 inches and a thickness of about 0.25 inches.

13. The calibration device of claim 1, further including an indexing plate fixed to the calibration device and including a multiplicity of angular positions.

14. The calibration device of claim 13, wherein the indexing plate mounted to the support portion.

15. The calibration device of claim 1, wherein the filler between the flat sheets is an adhesive.

16. The calibration device of claim 15, wherein the adhesive is a high shear strength glue.

17. The calibration device of claim 1, further including a square rod running the length of the support portion along a bottom of the support portion.

18. The calibration device of claim 17, wherein the square rod is an about ¼ inch by about ¼ inch aluminum rod adhered to the support portion with a high shear strength adhesive.

19. A calibration device, comprising:
    a long arm configured to support precisely spaced apart calibration artifacts;
    a header filled with a thermally stable filling surrounding the long arm;
    kinetic mounts attached to opposite ends of the arm;
    a support portion comprising:
        at least four flat sheets not more than 0.100 inches thick and made from aluminum material, attached to the header;
        a high shear strength glue holding the flat sheets to a fixed spacing; and
        support bars overlapping the flat sheets and running about the length of the header and residing just under the header; and
    an indexing plate fixed to the calibration device and including a multiplicity of angular positions.

20. A calibration device, comprising:
    a long arm configured to support precisely spaced apart calibration artifacts;
    a header filled with a thermally stable filling surrounding the long arm;
    kinetic mounts attached to opposite ends of the arm;
    a support portion comprising:
        about four flat aluminum sheets about 0.020 inches thick, attached to the header;
        a high shear strength glue holding the flat sheets to a fixed spacing; and
        about five aluminum support bars having heights of about 1.5 inches and a thicknesses of about 0.25 inches overlapping the flat sheets and running about the length of the header and residing just under the header;
    a ¼ inch by ¼ inch aluminum square rod running the length of the support portion along a bottom of the support portion adhered to the support portion with a high shear strength adhesive; and
    an indexing plate fixed to the calibration device and including a multiplicity of angular positions.

\* \* \* \* \*